United States Patent [19]
Nakabayashi et al.

[11] Patent Number: 5,710,608
[45] Date of Patent: Jan. 20, 1998

[54] METHOD OF ORIENTATION TREATMENT OF ORIENTATION FILM AND APPARATUS OF ORIENTATION TREATMENT OF ORIENTATION FILM

[75] Inventors: Masahiro Nakabayashi; Norio Asagi; Hajime Kuwahara, all of Kyoto; Taizou Ehara, Tokyo, all of Japan

[73] Assignee: Nissin Electric Co., Ltd., Kyoto, Japan

[21] Appl. No.: 579,359

[22] Filed: Dec. 27, 1995

[30] Foreign Application Priority Data

Dec. 28, 1994 [JP] Japan .................................... 6-338469

[51] Int. Cl.$^6$ ............................................. G02F 1/1337
[52] U.S. Cl. .......................... 349/125; 349/123; 349/126
[58] Field of Search ........................ 359/76, 78; 204/192; 350/341; 252/299, 582

[56] References Cited

U.S. PATENT DOCUMENTS

| | | | |
|---|---|---|---|
| 4,030,997 | 6/1977 | Miller et al. | 428/1 |
| 4,153,529 | 5/1979 | Little et al. | 350/341 |
| 5,011,623 | 4/1991 | Yoshinaga et al. | 252/299 |
| 5,030,322 | 7/1991 | Shimada et al. | 156/655 |

FOREIGN PATENT DOCUMENTS

| | | | |
|---|---|---|---|
| 2502633 | 9/1992 | European Pat. Off. | |
| 1583997 | 2/1994 | European Pat. Off. | |
| 13806770 | 9/1989 | Germany. | |
| 14219636 | 12/1993 | Germany. | |
| 4084123 | 3/1992 | Japan | 359/76 |
| 6194662 | 7/1994 | Japan | 359/76 |

OTHER PUBLICATIONS

Dietrich Meyerhofer, New Technique of Aligning Liquid Crystals on Surfaces; Applied Physics Letters, vol. 29, Nos. 11, 1; Dec., 1976.

*Primary Examiner*—William L. Sikes
*Assistant Examiner*—Julie Ngo
*Attorney, Agent, or Firm*—Finnegan, Henderson, Farabow, Garrett & Dunner, L.L.P.

[57] ABSTRACT

In a method and an apparatus of orientation treatment of an orientation film according to the present invention, the surface of a orientation film formed on a substrate for orientating liquid-crystal molecules is rubbed in a predetermined direction. Thereafter ion beams are radiated onto the orientation film in a vacuum in a direction different from the rubbing direction, that is, in the direction obliquely above the orientation film surface. In the method, these steps can be reversed.

6 Claims, 3 Drawing Sheets

5,710,608

METHOD OF ORIENTATION TREATMENT OF ORIENTATION FILM AND APPARATUS OF ORIENTATION TREATMENT OF ORIENTATION FILM

BACKGROUND OF THE INVENTION

1. Field of the Invention

The present invention relates to a method of orientation treatment of an orientation film, which is, for example, used in manufacturing a liquid-crystal display, or the like, and which is to carry out orientation treatment on an orientation film for orientating liquid-crystal molecules in a predetermined direction, and an apparatus therefor.

2. Description of the Related Art

A surface of a substrate is, conventionally, coated with an orientation film consisting of a high-molecular organic material such as polyimide in order to orientate liquid-crystal molecules in a predetermined direction on the surface of the substrate.

In this case, even if the surface of the substrate is simply coated with the orientation film, the liquid-crystal molecules cannot be disposed in a predetermined direction but they are arranged merely in parallel with the surface of the substrate.

Therefore, conventionally, the surface of the orientation film is rubbed mechanically in a predetermined direction with a rubbing cloth formed from nylon, rayon, or the like, so that orientation treatment is given thereto to thereby make the liquid-crystal molecules be arranged in the direction of rubbing.

Further, in order to widen the angle of the visual field of a liquid-crystal display, the surface of one orientation film is rubbed twice in different directions by using such a rubbing cloth as mentioned above so as to carry out orientation treatment which enables so-called multi-domain orientation. The multi-domain orientation means that liquid-crystal molecules are orientated in two directions. With such multi-domain orientation, the angle of the visual field can be widened while the contrast decreases.

In such a method in which rubbing is carried out twice to thereby widen the angle of the visual field, however, particles (dusts) are generated every time when the rubbing is carried out. Thus, a large number of particles are generated to cause a problem that such particles deteriorate the characteristic of a liquid-crystal display to thereby reduce the yield. For example, if particles are generated and adhere to an orientation film, unevenness of display arises to deteriorate the quantity of display, or an electrically shortcircuiting place is generated.

SUMMARY OF THE INVENTION

It is an object of the present invention to provide a method and an apparatus of orientation treatment of an orientation film in which the angle of the visual field of a liquid-crystal display can be widened, and the generation of particles can be reduced.

A method of orientation treatment of an orientation film formed on a substrate for orientating liquid-crystal molecules according to the present invention is comprised of the steps of: rubbing a surface of the orientation film; and radiating ion beams onto the orientation film in a vacuum. Alternatively, in the method according to the present invention, the rubbing step and radiating step can be reversed.

According to the method and apparatus according to the present invention, orientation treatment can be given to the orientation film without contact in the ion beam radiation. Accordingly, only a very small number of particles are generated. That is, the generation of particles can be reduced in comparison with a conventional method where rubbing treatment is carried out twice. As a result, for example, the factors to deteriorate the characteristic of the liquid-crystal display is reduced, so that it is possible to improve the yield of the liquid-crystal display.

BRIEF DESCRIPTION OF THE DRAWINGS

In the accompanying drawings.

DETAILED DESCRIPTION OF THE INVENTION

Figure 1:
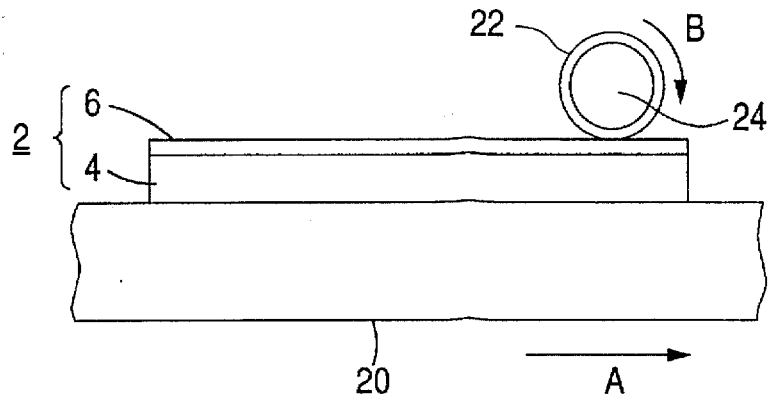
FIG. 1 is a schematic view illustrating an example of an apparatus for giving rubbing treatment to an orientation film.

Detailed description of the present invention will be described referring to the accompanying drawings.

In a method of orientation treatment of an orientation film according to the present invention, a surface of an orientation film, which is formed on a substrate for orientating liquid-crystal molecules, is rubbed in a predetermined direction by using a rubbing material, and thereafter ion beams are radiated onto the orientation film in a vacuum from a direction different from the direction of rubbing by the rubbing material and from obliquely above the surface of the orientation film.

In this case, the above-mentioned order of rubbing and ion beam radiation may be reversed.

Further, in a method of orientation treatment of an orientation film according to the present invention, ion beams are radiated onto an orientation film, which is formed on a substrate for orientating liquid-crystal molecules, in a vacuum from a direction substantially perpendicular to a surface of said orientation film, and thereafter the surface of said orientation film is rubbed by using a rubbing material.

Also, in this case, the above-mentioned order of rubbing an ion beam radiation may be reversed.

By radiation of ion beams onto an orientation film, it is possible to give orientation treatment to the orientation film. The reason why the orientation treatment can be given in this manner is that the surface of the orientation film is improved by the ion beam radiation so that macromolecules forming the orientation film are arranged in a predetermined direction and liquid-crystal molecules are orientated along the macromolecules. Alternatively, a plurality of very small channels are formed in the Surface of the orientation film by the sputtering due to the ion beam radiation so that liquid-crystal molecules are orientated along those small channels.

In this case, it was confirmed by experiments that if the ion beams are radiated onto the surface of the orientation film from obliquely above the surface, the degree of orientation order becomes so large that the orientation directions of the liquid-crystal molecules are apt to be arranged in the same direction, and if the ion beams are radiated onto the surface of the orientation film from the direction substantially perpendicular to the surface (that is, from substantially just above the surface), the degree of orientation order becomes so small that the orientation directions of the liquid-crystal molecules become at random.

Therefore, if the ion beams are radiated onto the surface of the orientation film from obliquely above the surface as mentioned above, and the direction of rubbing is made different from that of the ion beam radiation, the orientation film can have two different orientation directions so that multi-domain orientation can be realized. As a result, it is possible to widen the angle of the visual field of a liquid-crystal display.

On the other hand, if the ion beams are radiated onto the surface of the orientation film from the direction substantially perpendicular to the surface, the orientation film can be made to have random orientation directions, so that the liquid-crystal molecules show random orientation. Accordingly, the degree of light diffusion becomes strong. Consequently, it is possible to widen the angle of the visual field of a liquid-crystal display. Although the pretilt angle of the liquid-crystal molecules is small only by such random orientation treatment with the ion beams radiation, the pretilt angle can be increased by using rubbing treatment together.

In any method mentioned above, the rubbing treatment is required to be carried out only once, and the orientation treatment can be given to an orientation film without contact at the time of ion beam radiation. Accordingly, a very small number of particles are generated so that the production of particles can be reduced in comparison with a conventional method where rubbing treatment is carried out twice.

First, an embodiment in which multi-domain orientation is realized by carrying-out rubbing treatment and ion beam radiation upon an orientation film will be described.

Rubbing treatment upon an orientation film is carried out, for example, by use of such an apparatus as shown in FIG. 1. This apparatus has a moving table 20 which moves in a predetermined direction, for example, in the direction of arrow A. A substrate 2 with an orientation film to which orientation treatment is to be given is placed on the table 20.

The substrate 2 with an orientation film is formed in a manner so that a surface of a glass substrate 4 is covered with an orientation film 6 formed from a high-molecule organic material such as polyimide in this embodiment. In addition to polyimide, as the high-molecule organic material, polyamide, polycarbonate, polyester, polysulfone and the like may be used. In the case of constituting liquid-crystal display, a transparent electrode of ITO (indium oxide doped with tin), or the like, is formed between the glass substrate 4 and the orientation film 6.

A rubbing material 22 is provided above the moving table 20. When the moving table 20 is moved, for example, in the direction of arrow A, the surface of the orientation film 6 of the substrate 2 with a orientation film is rubbed by this rubbing material 22.

Although, the rubbing material 22 is wound on the outer periphery of a roller 24 in the drawing which is constituted, for example, by a rubbing cloth formed from nylon, rayon, or the like, the rubbing material 22 may be a brush-like member, or the like, formed of the same or similar material. The rubbing material 22 in this embodiment is rotated in the direction opposite to the moving direction of the moving table 20 as shown by the arrow B.

Figure 4:
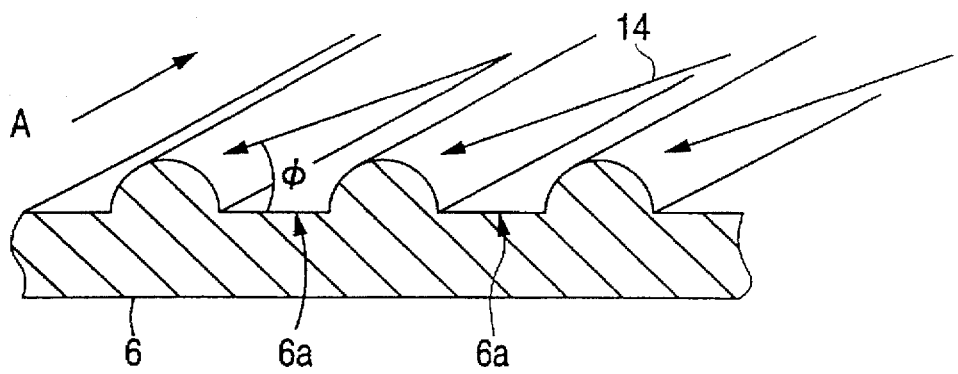
FIG. 4 is an enlarged view typically illustrating an example of the state where ion beams are radiated onto an orientation film after the rubbing treatment.

If the surface of the orientation film 6 is rubbed in such a manner as mentioned above, a number of very small channels 6a are formed in the surface of the orientation film 6 along the rubbing direction as shown as an enlarged view in FIG. 4, that is, along the moving direction A of the substrates with an orientation film shown in FIG. 1.

This itself is the same as the rubbing treatment carried out conventionally, and in a liquid-crystal display constituted by using such a substrate 2 with an orientation film, liquid-crystal molecules are orientated along the longitudinal direction of the channels 6a.

Figure 2:
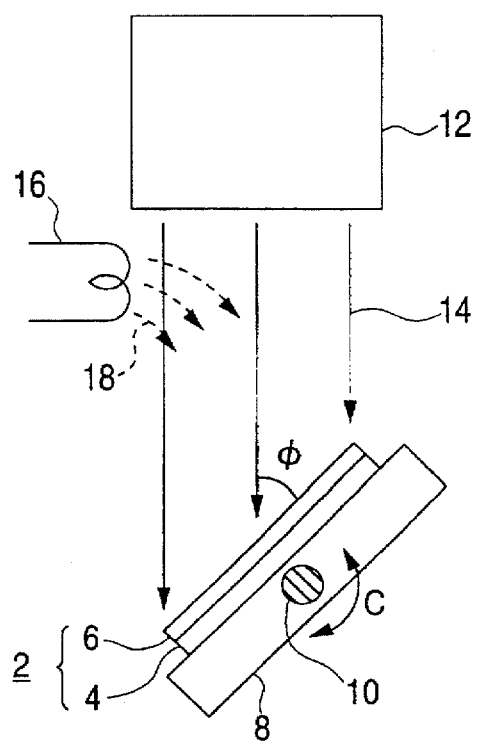
FIG. 2 is a schematic view illustrating an example of an apparatus for radiating ion beam onto an orientation film.

Ion beam radiation onto the orientation film 6 is carried out, for example, by using such an apparatus as shown in FIG. 2. This apparatus is provided in a not-shown vacuum vessel, and has a holder 8 for holding the substrate 2 with an orientation film to which orientation treatment is to be given. In this embodiment, this holder 8 is made to be rotatable centering a rotation shaft 10 as shown by the arrow C so that a radiation angle $\phi$ of ion beams 14 onto the surface of the orientation film 6 can be changed. An ion source 12 for radiating the ion beams 14 toward the orientation film 6 of the substrate 2 with an orientation film on the holder 8 and a filament 16 for supplying electrons 18 to the orientation film 6 are provided above the holder 8.

Preferably, ion beams of inert gas, for example, such as helium, neon, argon, or the like, are used for the ion beams 14 so that the ions do not react with the orientation film 6 to change the characteristic of the orientation film 6.

The acceleration energy of the ion beams 14 is not limited specifically, and may be, for example, in a range of about 100 eV to 500 eV.

When the ion beams are radiated onto the orientation film 6, preferably, the electrons 18 extracted from the filament 16 are supplied to the orientation film 6 to thereby neutralize positive charges given by the ion beams 14. If the positive charges given by the ion beams 14 are collected in the surface of the orientation film 6, those positive charges prevent the ion beams 14 from coming flying so as to make the treatment of the orientation film 6 difficult or uneven, and, further, those positive charges disturb the orientation of liquid-crystal molecules when liquid-crystal cells are formed after the orientation treatment. Such troubles can be prevented by the supply of electrons.

In the orientation treatment, first, the surface of the orientation film 6 is rubbed in a predetermined direction with the rubbing material 22 by using such an apparatus as shown in FIG. 1, and thereafter by using such an apparatus as shown in FIG. 2, the ion beams 14 are radiated onto the orientation film 6 to which the rubbing treatment has been carried out.

Figure 3:
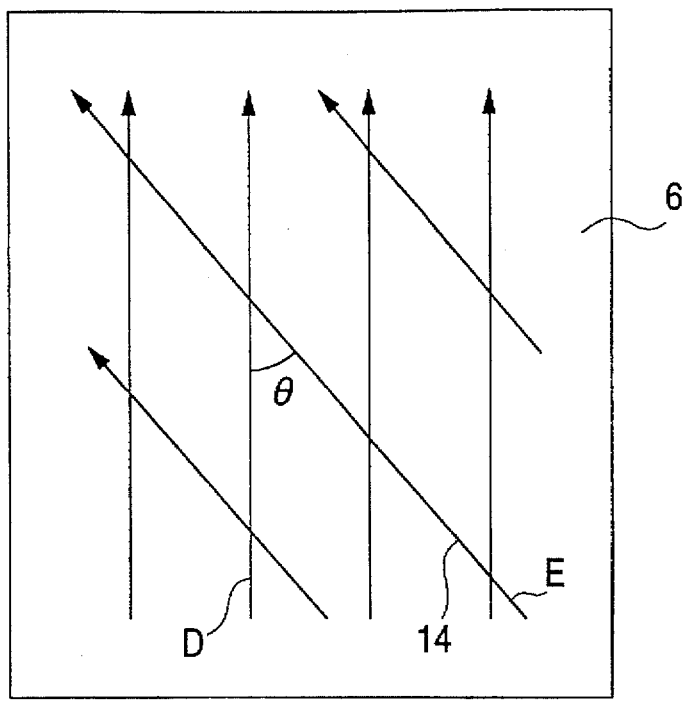
FIG. 3 is a plan view illustrating an example of the relationship between the rubbing direction and the ion beam radiation direction.

At this time, the radiation of the ion beams 14 is carried out at a predetermined azimuth angle $\theta$ relative to the rubbing direction D of the rubbing material 22 (this is equal to the moving direction A in FIG. 1) in the plane view, for example, as shown in FIG. 3, so that the ion beam radiation is carried out in the direction different from the rubbing direction D. The reference letter E represents the radiation direction of the ion beams 14. In addition, the radiation of the ion beams 14 is carried out at a predetermined radiation angle $\phi$ relative to the surface of the orientation film 6 in the up/down view, for example, as shown in FIG. 4, that is, the ion beams are radiated in the direction obliquely above the orientation film surface.

The orientation treatment may be given to the orientation film 6 even by the radiation of the ion beams 14 onto the orientation film 6 such a manner as mentioned above. The reason therefor is considered as follows. That is, the surface of the orientation film 6 is improved by the radiation of the ion beams so that macromolecules forming the orientation film 6 are arranged in a direction having a predetermined relationship with the ion beam radiation direction E, for example, arranged along the ion beam radiation direction E, and liquid-crystal molecules are orientated along the macromolecules. Alternatively, a plurality of very small channels are formed in the surface of the orientation film 6 along the ion beam radiation direction E by sputtering due to the ion beams radiated so that liquid-crystal molecules are orientated along those small channels.

Therefore, by making the ion beam radiation direction E and the rubbing direction D different from each other as described above as shown by the azimuth angle θ in FIG. 3, the orientation film 6 has two orientation directions different from each other. Accordingly, multi-domain orientation can be realized. In that case, preferably, the radiation angle φ of the ion beams 14 onto the orientation film surface is small.

One of the reasons therefore is as follows. As seen from FIG. 4, the channels 6a, that is, irregularities are formed in the surface of the orientation film 6 by the rubbing treatment, and when the ion beams 14 is radiated in the direction obliquely above the surface, the portion irradiated with the ion beams 14 and the portion not irradiated therewith are produced so that the orientation treatment by the ion beam radiation is given only to the portion irradiated with the ion beams 14. The orientation treatment has been given to the channels 6a by the preceding rubbing treatment. Accordingly, in order not to weaken the effect of the orientation treatment, the ion beams 14 are made not to be incident on the bottom portions of the channels 6a, as much as possible. It is therefore preferable to make the radiation angle φ of the ion beams 14 small.

Figure 5:
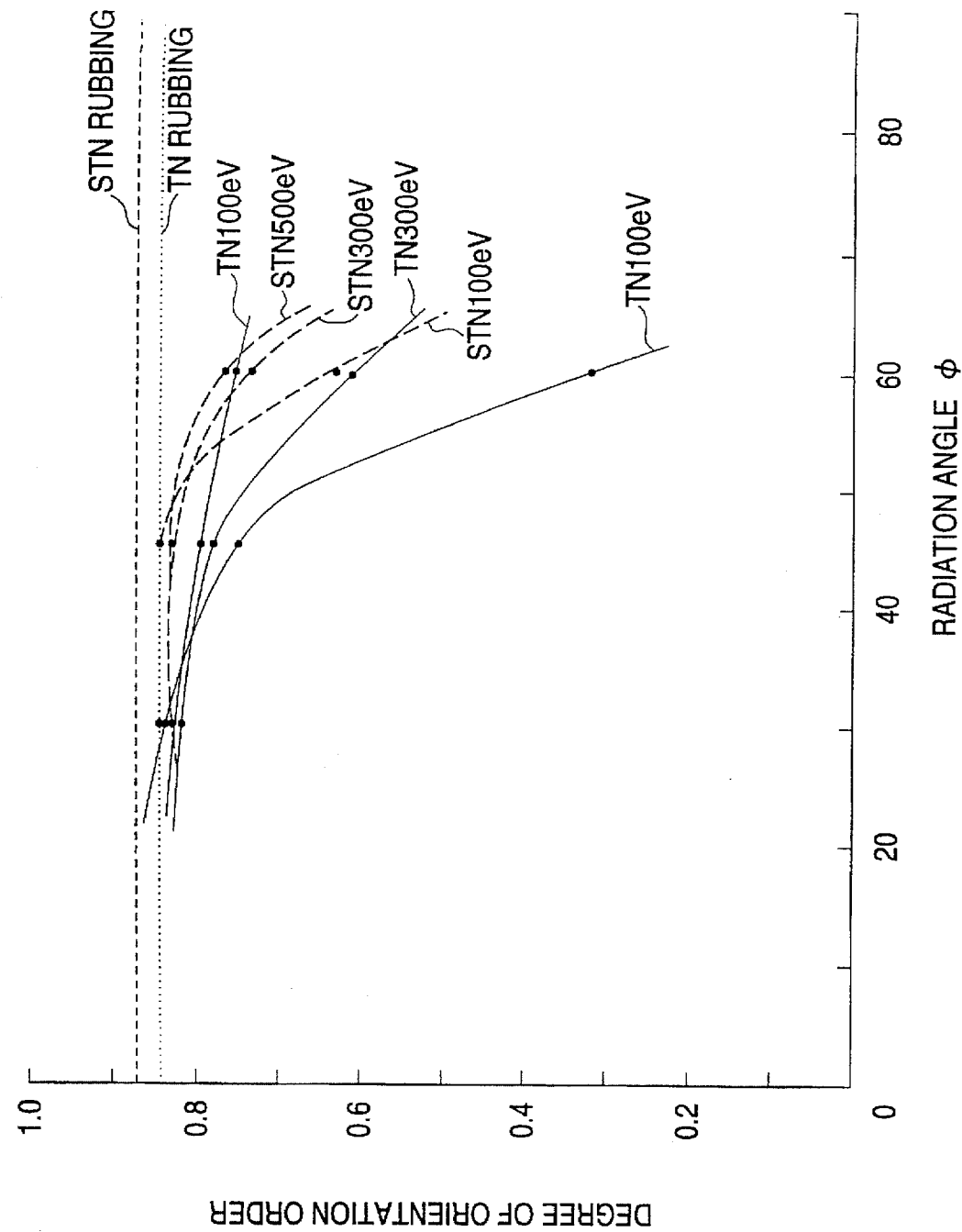
FIG. 5 is a diagram illustrating an example of the results of measuring the relationships between the radiation angle of ion beams and the degree of orientation order of an orientation film.

The other reason is that the smaller the radiation angle φ of the ion beams 14 is, the larger degree of orientation order can be obtained by the ion beam radiation. FIG. 5 shows an example of the results of measurement of the relationship between the radiation angle φ of the ion beams 14 and the degree of orientation order of liquid crystal. Herein, the degree of orientation order means the percentage of the liquid-crystal molecules orientated in the same direction, and the value 1 in FIG. 5 designates 100%. In addition, TN or STN in the drawing shows that an orientation film for TN (twist nematic) mode or an orientation film for STN (super twist nematic) mode was used as the orientation film 6. The numerical values following TN and STN indicate energy of the radiated ion beams 14. The results by the rubbing are also shown in the drawing for the sake of comparison.

It is understood from this drawing that the smaller the radiation angle φ of the ion beams 14 is, the larger the degree of orientation order becomes. It is understood that particularly if the radiation angle φ is made to be smaller than 30 degrees, it is possible to obtain a degree of orientation order as large as that obtained by rubbing, regardless of the kind of the orientation film 6 and the intensity of the energy of the ion beams 14. The reason for this can be considered that as the radiation angle φ of the ion beams 14 is made smaller, stronger orientation can be given to the arrangement of high molecules forming the orientation film 6. Alternatively, the very small channels formed in the surface of the orientation film 6 by the sputtering due to the ion beam radiation become longer and narrower in the direction of the ion beam radiation.

As described above, if the radiation angle φ is made smaller, the larger degree of orientation order can be obtained by the ion beam orientation, and the effect of the orientation treatment by rubbing is not reduced, so that it is possible to realize more clear multi-domain orientation. Accordingly, the allowable range of the radiation angle φ is in a range of 0° to 40°, and preferably is in a range of 20° to 30°.

According to this embodiment, multi-domain orientation can be realized as mentioned above. As a result, the angle of the visual field of a liquid-crystal display can be widened.

In addition, according to the above method, the rubbing treatment is required to be carried out only once, and the orientation treatment can be given to an orientation film without contact in the process of ion beam radiation. Accordingly, the generation of particles is less, and hence it can be reduced in comparison with a conventional method where the rubbing treatment is carried out twice. As a result, for example, the factors to deteriorate the characteristic of a liquid-crystal display are reduced, so that it is possible to improve the yield of the liquid-crystal display.

The order of the rubbing treatment and the ion beam treatment in the above embodiment may be reversed. That is, first, the ion beams 14 are radiated onto the orientation film 6 at the radiation angle φ relative to the surface of the orientation film 6, that is, in the direction obliquely above the orientation film 6. Thereafter, the surface of the orientation film 6 irradiated with the ion beams is rubbed with the rubbing material 22 at the predetermined azimuth angle θ relative to the ion beam radiation direction E, that is, in the direction D different from the ion beam radiation direction E (see FIG. 3).

In the case of this method, the orientation treatment in a predetermined direction is given to the whole surface of the orientation film 6 by the above-mentioned action by the preceding ion beam radiation, and thereafter a number of channels 6a as mentioned above are formed in the surface of the orientation film 6 by the rubbing treatment. The formation of the channels by the rubbing treatment is stronger than the reformation of the orientation film surface or the formation of very small channels by the ion beam radiation, so that liquid-crystal molecules at the channels 6a are orientated along the channels 6a while liquid-crystal molecules in the other portions are orientated along the ion beam radiation direction E.

Therefore, also according to this method, multi-domain orientation can be realized, so that the angle of the visual field of a liquid-crystal display can be widened. In addition, in the same manner as in the above-mentioned embodiment, the production of particles can be reduced in comparison with a conventional method where rubbing treatment is carried out twice.

It cannot be said that there is no fear that the rubbing treatment following the ion beam radiation weakens the effect of the orientation treatment by the ion beam radiation. Therefore, it can be said that it is preferable to carry out the rubbing treatment previously as in the previous embodiment.

Next, an embodiment which can realize random orientation by carrying-out ion beam radiation and rubbing treatment upon an orientation film will be described.

The ion beam radiation upon the orientation film 6 is carried out, for example, by using such an apparatus as shown in FIG. 2. The radiation angle φ of the ion beams 14 is, however, set to about 90 degrees, and the ion beams 14 are radiated onto the orientation film surface in the direction substantially perpendicular thereto (that is, from almost above). In such a manner, the degree of orientation order obtained by the ion beam radiation becomes small as described with reference to FIG. 5. That is, the orientation film 6 has random orientation directions, so that liquid-crystal molecules show random orientation to thereby increase the degree of light diffusion. Also by this, it is possible to widen the angle of the visual field of a liquid-crystal display.

Only with such orientation treatment by the ion beam radiation as mentioned above, the pretilt angle of the liquid-crystal molecules is small. It can be considered the reason therefore is that such clear channels as formed by the rubbing method in the surface of the orientation film 6 cannot be formed by the ion beam radiation.

Therefore, in order to compensate for this, the surface of the orientation film 6 irradiated with the ion beams is rubbed by using a rubbing material. This is carried out, for example, by using such an apparatus as shown in FIG. 1. In this case, because the ion beams are radiated onto the orientation film 6 substantially from just above in the preceding ion beam radiation with no directional property, the direction of rubbing may be arbitrary.

A number of very small channels 6a, for example as shown in FIG. 4, are formed in the surface of the orientation film 6 by this rubbing treatment. With such channels 6a, liquid-crystal molecules are apt to rise in the channels 6a, so that the pretilt angle becomes large. When the pretilt angle is large, the direction in which the liquid-crystal molecules rise upon application of a voltage can be defined so accurately that the characteristic of a liquid-crystal display becomes superior.

Even if the rubbing treatment is carried out after the random orientation treatment by the ion beam radiation as mentioned above, it is possible to give orientation at random on liquid-crystal molecules in the portion other than the channels 6a. When the orientation film is subjected to only the rubbing treatment, orientation treatment is, though weakly, given to the portion other than the channels substantially in the same direction as in the channels. On the other hand, in the case of the above embodiment, liquid-crystal molecules in the portion other than the channels 6a can be orientated at random if random orientation treatment is given in advance strongly but to an extent that the effect of the random orientation treatment cannot be eliminate by the succeeding rubbing treatment.

According to the method of this embodiment, random orientation can be realized in such a manner as described above. As a result, it is possible to widen the angle of the visual field of a liquid-crystal display. In addition, in the same manner as in any of the above embodiments, the generation of particles can be reduced in comparison with a conventional method where rubbing treatment is carried out twice.

The order of the rubbing treatment and the ion beam radiation in the above embodiment may be reversed. That is, first, the surface of the orientation film 6 is rubbed with the rubbing material 22, and thereafter, the ion beams 14 are radiated onto the surface of the orientation film 6 substantially in the direction perpendicular thereto.

In the case of this method, a number of very small channels 6a as mentioned above are formed in the surface of the orientation film 6 by the preceding rubbing treatment, and thereafter random orientation treatment as mentioned above is given by ion beam radiation. Also in this case, the pretilt angle of liquid-crystal molecules becomes large in the channels 6a. Since the orientation treatment given by the preceding rubbing treatment is weak in the portion other than the channels 6a, if the random orientation treatment by the ion beam radiation is carried out strongly enough to cancel the effect of the orientation treatment by the rubbing treatment, the liquid-crystal molecules in the portion other than the channels 6a can be orientated at random.

Therefore, also in this method, it is possible to realize random orientation, so that it is possible to widen the angle of the visual field of a liquid-crystal display. In addition, in the same manner as in any of the above embodiments, the generation of particles can be reduced in comparison with a conventional method where rubbing treatment is carried out twice.

What is claimed is:

1. A method of orientation treatment of an orientation film of a high molecular weight organic material formed on a substrate for orientating liquid-crystal molecules, comprising the steps of:

rubbing a surface of said orientation film; and radiating ion beams onto the rubbed surface of said orientation film in a vacuum from a direction substantially perpendicular to the surface of said orientation film.

2. A method according to claim 1, further comprising the step of: simultaneously to said radiating step, supplying electrons to said orientation film to neutralize positive charges given by said radiating step.

3. A method of orientation treatment of an orientation film of a high molecular weight organic material formed on a substrate for orientating liquid-crystal molecules, comprising the steps of:

radiating ion beams onto said orientation film in a vacuum from a direction substantially perpendicular to the surface of said orientation film; and rubbing a surface of the irradiated orientation film.

4. A method according to claim 3, further comprising the step of: simultaneously to said radiating step, supplying electrons to said orientation film to neutralize positive charges given by said radiating step.

5. An apparatus for orientation treatment of a high molecular weight organic material orientation film formed on a substrate for orientating liquid-crystal molecules, comprising in combination:

rubbing means for rubbing a surface of said orientation film; and radiating means for radiating ion beams onto said orientation film in a vacuum wherein said rubbing means rubs the surface of said orientation film in a predetermined direction, and said radiating means radiates said ion beams onto said orientation film from a direction different from the direction of the rubbing by said rubbing means and from a direction substantially perpendicular to the surface of said orientation film.

6. An apparatus according to claim 5, further comprising electron supplying means for supplying electrons to said orientation film to neutralize positive charges given by said radiating means.

* * * * *